Oct. 24, 1967

H. NERWIN 3,348,463

ONE-PIECE LIGHT-CONTROLLING STRUCTURE

Filed May 24, 1965

HUBERT NERWIN
INVENTOR.

BY R. Frank Smith
Morton A. Polster

ATTORNEYS

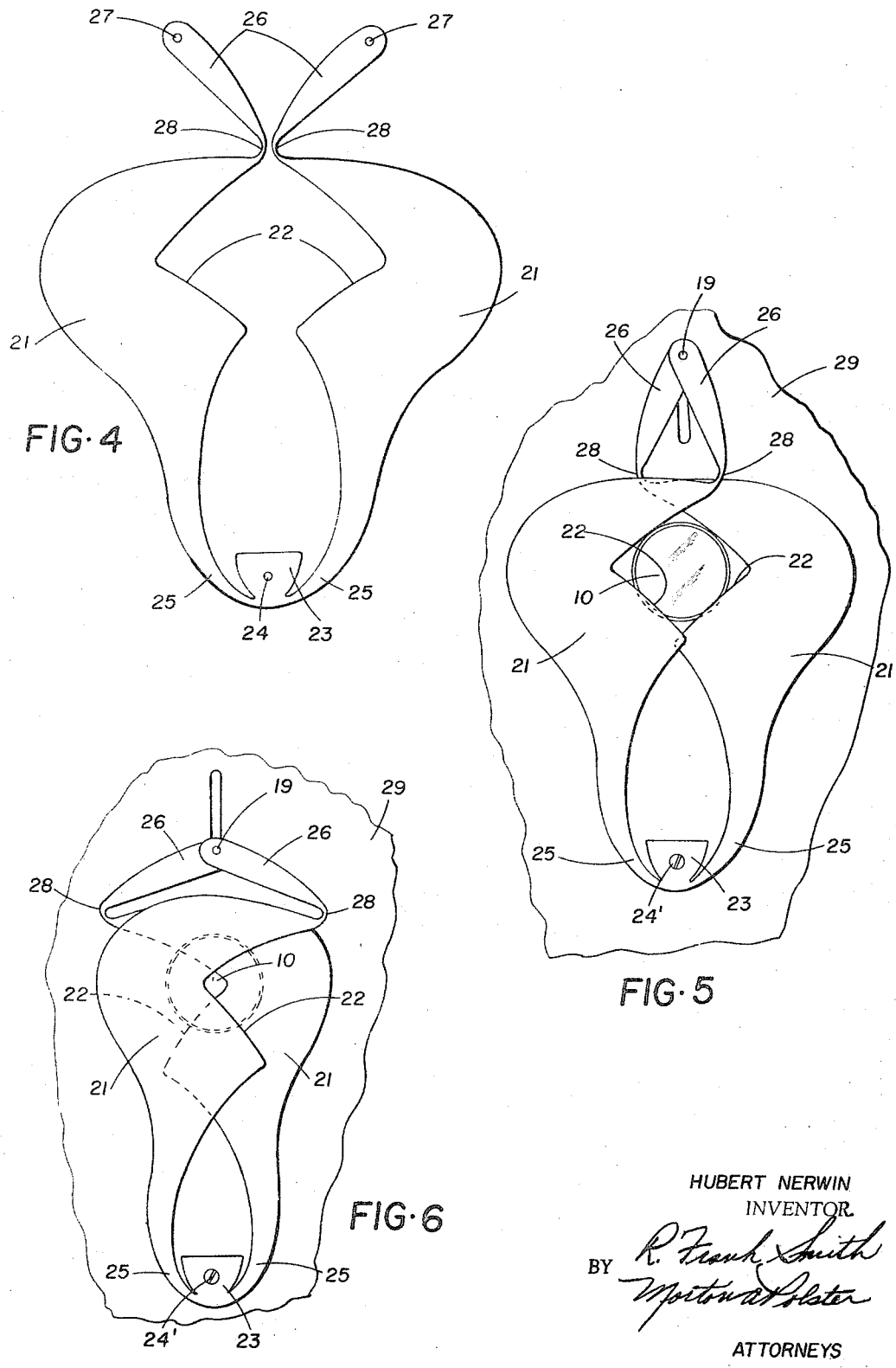

Oct. 24, 1967  H. NERWIN  3,348,463
ONE-PIECE LIGHT-CONTROLLING STRUCTURE
Filed May 24, 1965  5 Sheets-Sheet 3

HUBERT NERWIN
INVENTOR.

BY R. Frank Smith
Morton H. Sloter

ATTORNEYS

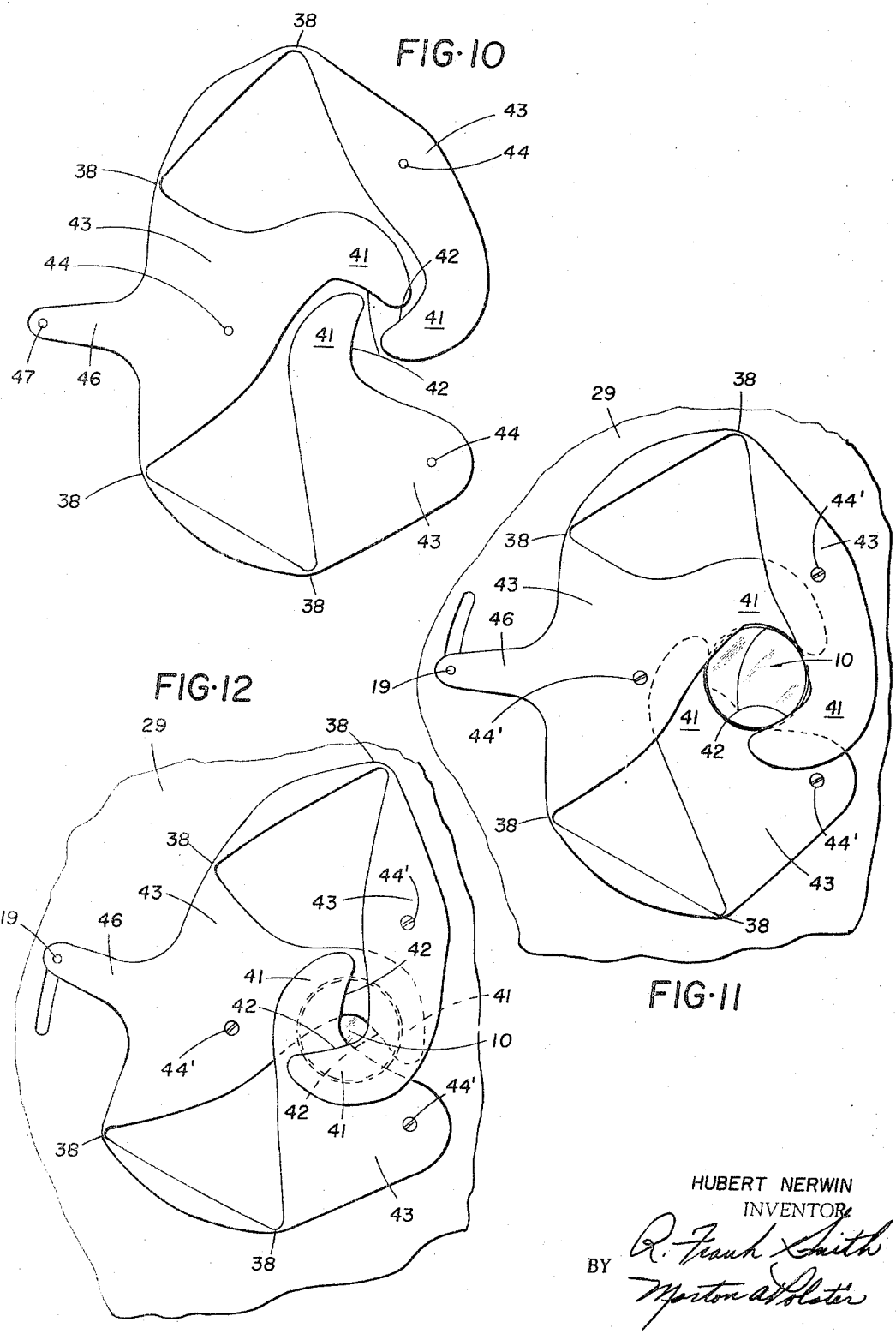

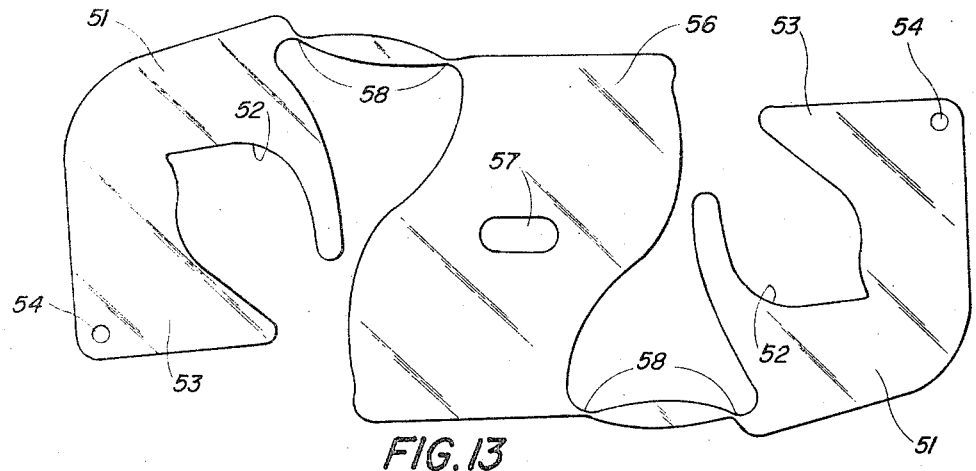
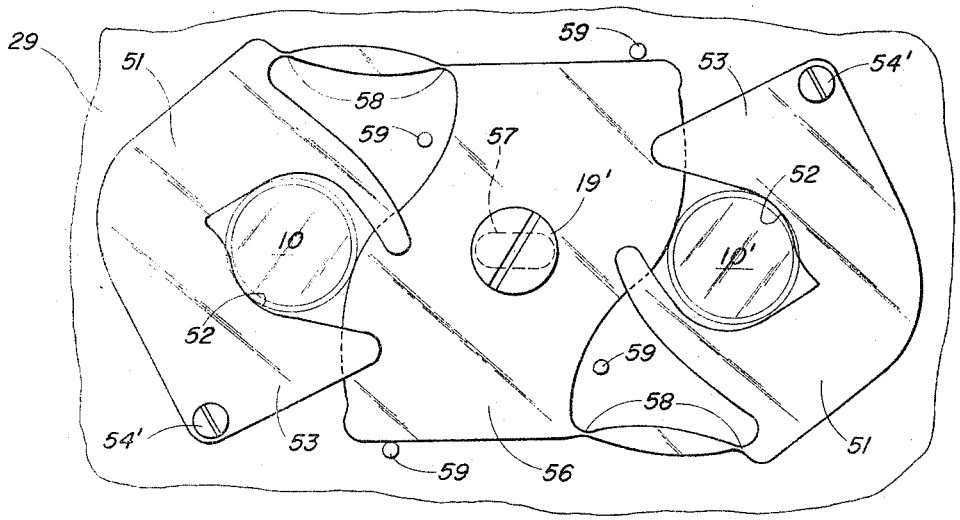
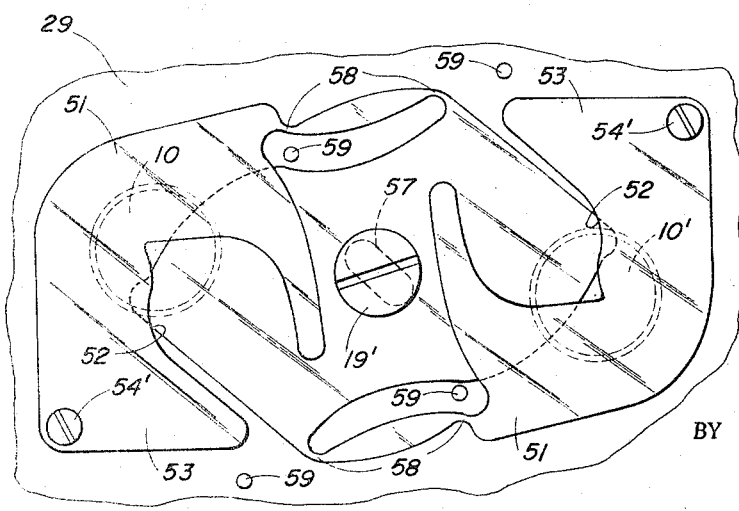

United States Patent Office 3,348,463
Patented Oct. 24, 1967

3,348,463
ONE-PIECE LIGHT-CONTROLLING STRUCTURE
Hubert Nerwin, Rochester, N.Y., assignor to Eastman Kodak Company, Rochester, N.Y., a corporation of New Jersey
Filed May 24, 1965, Ser. No. 463,454
21 Claims. (Cl. 95—64)

ABSTRACT OF THE DISCLOSURE

A one piece plastic diaphragm for controlling light intensity is formed with a small flexible portion which enables the vane portion of the diaphragm to be adjusted while the mount is held fixed.

---

This is a continuation-in-part of application Ser. No. 404,887, filed Oct. 19, 1964.

This invention relates to devices for controlling light in photographic apparatus and, more particularly, to a simple, one-piece light-controlling structure which includes means for interconnecting the structure with a camera's photoresponsive system, as well as mounting and spring portions for resiliently supporting and driving its exposure-controlling portions. However, although the invention will be explained in terms of its use in cameras, it should be noted that the novel one-piece structure disclosed herein is equally useful in all types of apparatus in which it is desirable to control the amount of light being transmitted along a predetermined axis.

In the automatic exposure control art, variable shutter speed setting devices and adjustable single and multiple-vane diaphragms are well known. However, in the past it has been necessary to provide a separate mechanism, usually including several elements, to drive each exposure-regulating device, and pulleys, pins, or slots have been used to couple the vanes to each other so that they move in unison for changing the size of the lens aperture. Such automatically controlled systems usually include elements for biasing the shutter timing mechanism or the diaphragm vane to an initial position, an element for sensing the output of the camera's photoresponsive circuitry (e.g., a trapped galvanometer pointer), and also require further means interconnecting the sensing element and the exposure-regulating device to position the latter in accordance with the output of the camera's photoresponsive circuit.

The present invention incorporates exposure-regulating diaphragm vanes as well as the vane-controlling elements into a simple, one-piece structure. By virtue of this unique one-piece structure, automatic exposure control systems for cameras can be greatly simplified since many of the separate elements previously required in such systems can be omitted while retaining their functions. Further, manufacture and assembly of such systems can be achieved with considerable economic savings.

Although the subject invention is described with particularity in terms of a unitary structure including diaphragm-forming vane portions, the novel one-piece structure disclosed herein may be used to position any exposure-controlling member, e.g., diaphragm rings, shutter speed controls, etc.

The structure is formed from a single piece of semirigid but flexible material having good dimensional stability and an extremely high fatigue resistance on flexing. Although the invention herein is not necessarily limited to any particular type of material, in actual practice preference should be given to polymeric materials formed of long-chain linear molecules having substantially no side chains or cross-linking between them. Such materials are well known and include synthetic crystalline polymeric materials such as polyamides, polycarbonates, polyesters, and polyolefins. In selecting materials for structure which will be used in cameras wherein the exposure regulating member is in close proximity to the film, the material from which such member is formed should also be substantially photographically inert. Further, in some instances it may be desirable that such material be substantially free of susceptibility to fungus growth, and it should retain its desired properties within temperature limits encountered in normal photographic usage, i.e., in the approximate range from —20° F. to 180° F. The material should be readily formable by cutting, stamping, molding, etc. into the desired configuration at minimum expense.

It is an object of this invention to provide a simple, economical one-piece structure for controlling exposure in cameras.

It is another object of this invention to provide a one-piece exposure-controlling structure including support portions, resilient bias portions, a portion for sensing the output of the camera's lighting condition indication means, as well as means for driving the exposure-controlling portions of the structure.

It is a further object of this invention to provide a one-piece structure including a plurality of diaphragm-forming vanes, means for supporting said vanes and resiliently biasing them to an initial position, an element responsive to the output of the camera's lighting condition indication means, and means for driving said vanes to form an aperture determined in accordance with the output of said lighting condition indication means.

Further objects, purposes and characteristic features of the invention herein shall be in part apparent from the following description and in part obvious from the accompanying drawings of the invention in which reference characters having the same suffix refer throughout the several views of the various embodiments to elements having the same function, and in which:

FIGS. 4, 5 and 6 illustrate a second embodiment of the one-piece exposure-controlling structure disclosed herein, FIG. 4 showing the structure of the second embodiment as initially formed, while FIGS. 5 and 6 illustrate this embodiment as mounted operationally in a camera in, respectively, an open and a partially closed position;

FIGS. 10, 11 and 12 are similar drawings of a fourth embodiment of the invention herein; and FIGS. 13, 14 and 15 are similar views of a fifth embodiment wherein two variable apertures are simultaneously formed by the one-piece structure disclosed herein.

Figure 1:
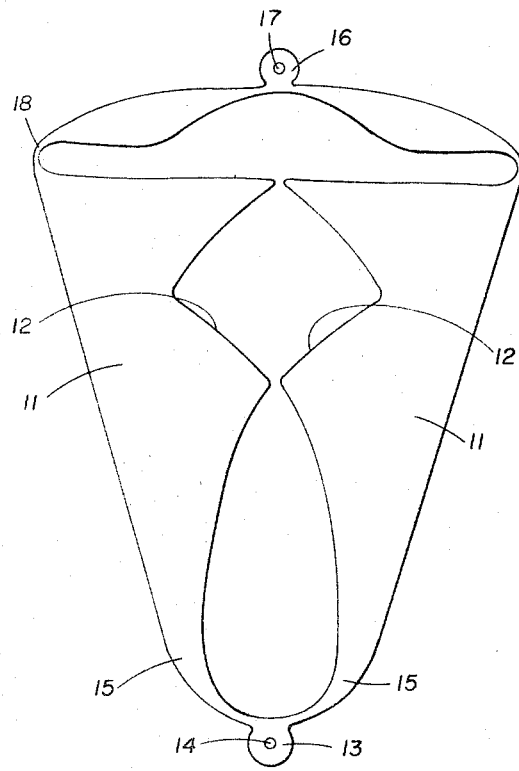
FIG. 1 illustrates one embodiment of the one-piece exposure-controlling structure as it might appear when initially formed and prior to actual assembly in a camera.

Referring now to FIG. 1, a generally O-shaped one-piece exposure-controlling structure is shown as it might appear immediately following fabrication and prior to actual assembly and mounting in a camera. A pair of oppositely disposed vane portions 11 each include aperture-forming edges 12. A mounting portion 13 includes a hole 14 for receiving a mounting screw or pin.

The vane portions are connected to the mounting portions by means of resiliently flexible portions 15 which bias the vane portions to the fully open position shown. The one-piece structure also includes a drive portion 16 in which hole 17 is formed. The purpose of hole 17 is to receive a sensing member which is positioned in accordance with the output of the camera's automatic exposure control system in a manner well known in the art. Drive portion 16 is interconnected with vane portions 11 by means of flexible portions 18 which form a resilient connection and permit vane portions 11 to be positioned as a function of the position of drive portion 16.

Figure 2:
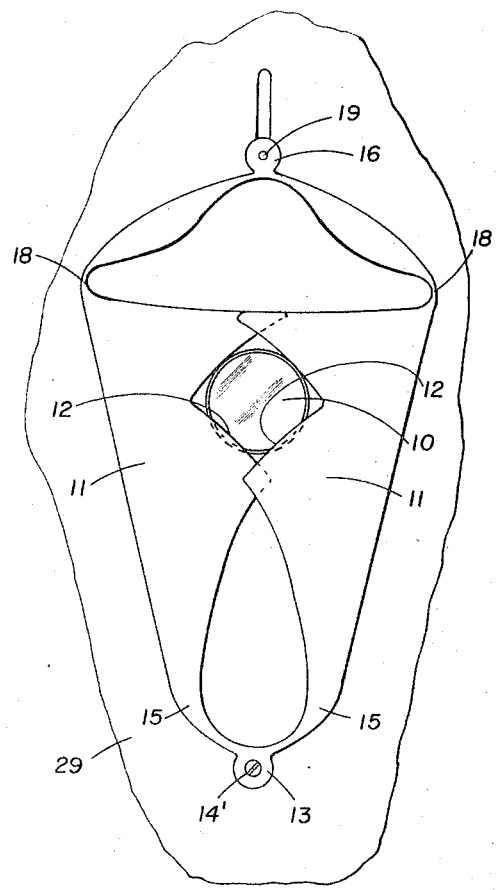
FIGS. 2 and 3 show the structure illustrated in FIG. 1 as it might appear when operatively assembled in a camera, FIG. 2 showing the aperture-forming vanes in an open position, and FIG. 3 illustrating the vanes in a partially closed position.
Figure 3:
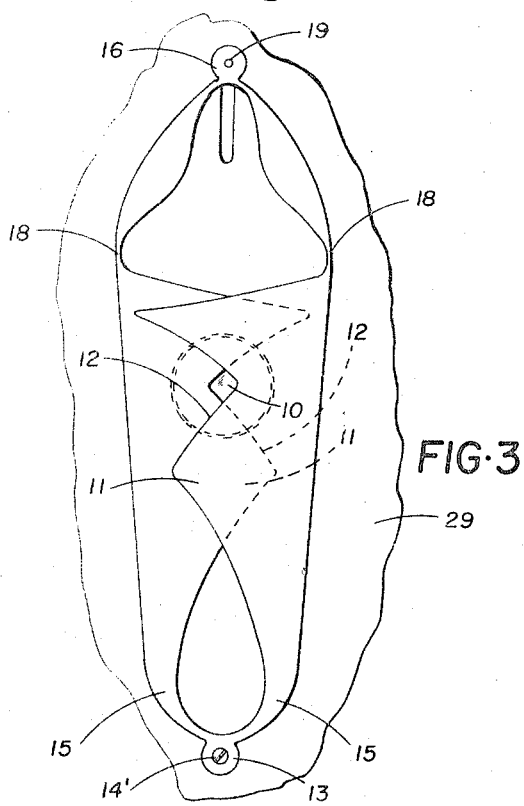
Figure 7:
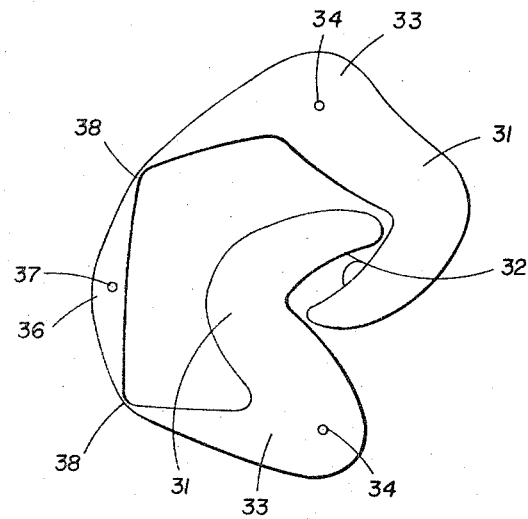
FIGS. 7, 8 and 9 are similar illustrations of a third embodiment of the one-piece structure disclosed herein.
Figure 9:
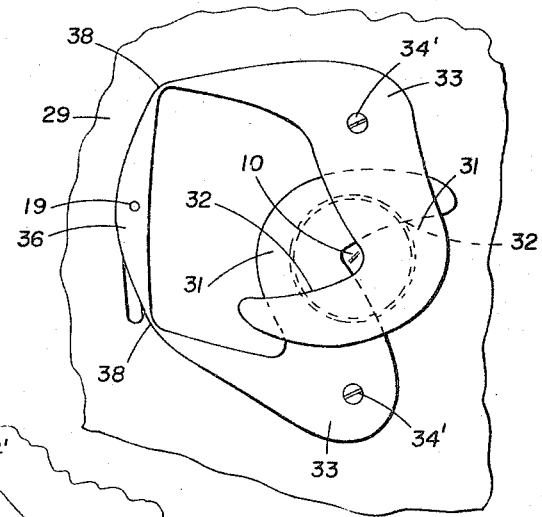
Figure 8:
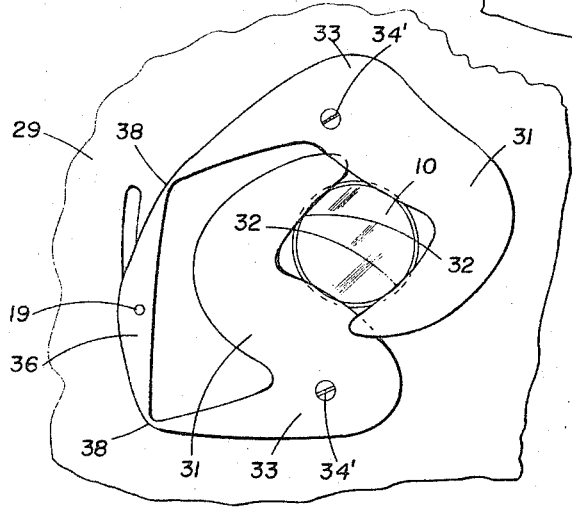

Referring now to FIGS. 2 and 3, the one-piece structure illustrated in FIG. 1 is shown attached by means of screw 14' to a camera mounting plate 29 which is provided with a lens 10 aligned with the camera's picture-taking axis. The camera also includes a sensing member 19 which is movable (when camera operation is initiated by the operator) to a position determined in accordance with the output of the camera's photoresponsive system. The positioning of sensing member 19 can be accomplished in any number of ways which are well known in the automatic exposure control art, e.g., member 19 may be a yieldably driven member that is moved into contact with a trapped pointer of a galvanometer which is included in a photoelectric circuit sensitive to the varying light intensity of the scene to be photographed. However, it should be noted that member 19 may also be manually positioned by the camera operator in accordance with his estimate of the lighting conditions under which photographs are to be taken.

In the position indicated in FIG. 2, it is assumed that sensing member 19 has been positioned in response to camera operation under conditions in which scene luminance (brightness) is relatively dim. In this case, aperture forming edges 12 of the vanes 11 are only slightly overlapped providing the maximum aperture for film-exposing light passing through picture-taking lens 10. When in the course of camera operation sensing member 19 is moved upwardly in response to increased scene luminance, it carries drive portion 16 upwardly, and this motion is translated to vane portions 11 by means of flexible interconnections 18 causing vane portions 11 to move into a more overlapping relationship as shown in FIG. 3.

In between settings of sensing member 19, resiliently flexible portions 15 act as springs to bias vane portions 11 back to the fully open limiting position illustrated in FIG. 2, also returning drive portion 16 to its initial limiting position by means of the interconnecting action of flexible portions 18. The biasing action of resilient portions 15 is sufficiently fast to permit use of the one-piece vane structure in cinematographic cameras as well as in still cameras. Namely, this biasing action is fast enough to return the structure to its initial position shown in FIG. 2 following each frame of exposure in a cinematographic camera, the vane structure being reset in accordance with the lighting conditions prior to the exposure of the next succeeding frame.

As was stated above, although the invention herein is not necessarily limited to any particular material, the satisfactory operation of the subject structure over extended periods requires the use of a material which combines the essential properties of good memory (required for spring-like bias) as well as extremely high resistance to flexing fatigue. The material must also be of sufficient rigidity to form satisfactory vane portions 11, mounting portion 13 and drive portion 16, taking into account suitable supports that can be provided for maintaining the moving parts of the invention in desired paths of movement.

Further, in view of the overlapping action of vane portions 11, the material selected preferably is essentially free of any plasticizer that might "bleed" to cause the vanes to stick to each other. Of course, it is desirable also to avoid use of any plasticizer that during the normal expected life of the camera might evaporate to such degree as to deprive the material of its required properties.

Particular attention is called to the formation of the linkage portions of the structure, namely, resiliently flexible portions 15 and flexible portions 18. The radius of curvature of portions 15 is selected so that the movement of vane portions 11 relative to mounting portion 13 does not exceed the elastic limit of the material forming the narrowed portions 15, thus assuring that portions 15 will maintain their resilient property and provide the desired bias referred to above. As to the narrowed, "necked-down" portions 18, the movement of drive portion 16 relative to vane portions 11 may be such as to exceed the elastic limit of the material forming portions 18. However, one of the properties of the materials having long-chain linear molecules referred to above is the ability to be subjected to just such repeated excessive flexure over extremely long periods without evidence of fatigue and, specifically, without rupture or severe weakness in the region of maximum flexure. As stated earlier, the synthetic polymeric materials have the various properties required for satisfactory operation of the one-piece structures disclosed herein, and in practice of the invention herein, polypropylene has been found to be a preferred material.

It should be understood that the remarks which have just been made concerning selection of materials apply equally to the other embodiments of the invention which will now be discussed in detail.

FIG. 4 illustrates a generally U-shaped one-piece exposure-controlling structure according to a second embodiment of the invention herein. Vane portions 21, with respective aperture-forming edges 22, are formed in the respective legs of the U-shaped structure and are interconnected with mounting portion 23 by means of resiliently flexible portions 25 which provide a spring force to bias vane portions 21 to the position illustrated in FIG. 4. A pair of drive portions 26 are each formed at the free ends of the U-shaped structure and each have a hole 27 for receiving sensing member 19. Drive portions 26 are interconnected with vane portions 21 by means of flexible portions 28.

FIGS. 5 and 6 illustrate the one-piece structure shown in FIG. 4 operatively connected to a camera mechanism, mounting portion 23 being attached to camera mounting plate 29 by means of a screw 24' passing through hole 24, while drive portions 26 are assembled to receive sensing member 19 in the manner shown. FIG. 5 illustrates the unitary structure in its fully open position with picture-taking lens 10 fully uncovered and sensing member 19 in a position indicative of dim scene luminance. When a photograph is to be made under conditions of bright scene luminance, it is assumed that sensing member 19 is moved downwardly in response to the altered output of the camera's photoresponsive means, resulting in the increased overlap of vanes 21 as illustrated in FIG. 6.

When used in either a cinematographic camera or a still camera, prior to the exposure of the next succeeding frame, sensing member 19 and vane portion 21 are returned by the biasing force of resiliently flexible portions 25 to the positions as shown in FIG. 5.

It should be noted it has been found that the second embodiment just described above provides a substantially linear relationship between the distance through which pin 19 and drive portion 26 move and the size of the aperture formed by vanes 21.

FIGS. 7–9 and 10–12 illustrate one-piece exposure-controlling structures according to third and fourth embodiments of the invention herein. In these multivane structures, each of the aperture-forming vane members 31 and 41, respectively, is contiguous to a mounting portion 33 and 43, respectively, each of the vane portions being individually mounted to the camera for movement about pins 34', 44' received through respective holes 34, 44 as can be seen in FIGS. 8 and 9, and FIGS. 10 and 11. In each of these embodiments a single drive portion 36 and 46, respectively, receives sensing member 19 and drives the multi-vane structure to form various apertures varying as a function of the position of sensing member 19, and the operative interconnections between respective drive portions 36 and 46 and their corresponding vane portions are provided by respective resiliently flexible portions 38 and 48.

FIGS. 13–15 illustrate a one-piece exposure-controlling structure in accordance with the fifth embodiment of the invention herein. This one-piece structure is designed to provide two variable apertures which may be simultaneously controlled by a single movable member, and it has particular application to stero cameras or to cameras having automatic exposure control systems of the "null" type which are well known in the art.

According to this fifth embodiment, the structure is initially formed in a basic S shape as illustrated in FIG. 13. Vane members 51, with their aperture forming edges 52, are integral with respective mounting portions 53 and are formed at the outer ends of the S. Drive portion 56 is formed in the central section of the S and is attached to the vane and mounting portions by means of resiliently flexible portions 58.

When operatively connected to a camera, as shown in FIGS. 14 and 15, mounting portions 53 of the one-piece structure are attached to mounting plate 29 by means of screws 54' which are passed through holes 54, and drive portion 56 is keyed through opening 57 to movable member 19' which is rotated to an angular position which varies with the light intensity of the scene being photographed. As similarly noted above in relation to sensing member 19, member 19' may be positioned manually or by yieldable drive means cooperating with the camera's photoresponsive system. As lighting conditions vary from the relatively dim scene luminance assumed in FIG. 14 to the relatively bright conditions assumed in FIG. 15, drive portion 56 is moved clockwise by member 19'. As drive portion 56 moves clockwise, vane portions 51 are moved clockwise around respective mounting screws 54', and aperture forming edges 52 cooperate in overlapping relation with the edges of drive portion 56 to provide two simultaneously controlled apertures for picture-taking lenses 10 and 10'. (A photocell would replace one picture-taking lens in the event the one-piece structure were being used in a "null" type exposure control system.) Stops 59 are provided to arrest movement of the one-piece structure in the respective limiting positions at which maximum and minimum apertures are formed.

As with the other embodiments described above, resiliently flexible portions 58 provide the necessary linkage unifying the operation of the mounting, vane, and drive portions of this unique one-piece exposure controlling structure.

Having explained the invention herein, it should be understood that the embodiments described above have been selected to facilitate understanding the invention and not to limit the number of forms the invention may take. Various alterations and modifications of the embodiments shown may be made to meet the requirements of practice without in any way departing from the spirit and scope of the invention herein as defined in the following claims.

What is claimed is:

1. A light controlling arrangement comprising a one piece structure having at least two portions where said structure is relatively flexible, said portions being very small with respect to the size of the remainder of said structure, and at least one point where said structure is held rigidly to a support, said structure having sections which are adapted to overlap when said flexible portions are flexed, the degree of overlap being determined by the position of at least one of said flexible portions with respect to said point where said structure is held rigidly, said flexible portions being remote from said point.

2. A one-piece light-controlling structure according to claim 1 wherein said structure consists essentially of a synthetic crystalline polymeric material selected from the group consisting of polyamides, polycarbonates, polyesters, and polyolefins.

3. A one-piece light-controlling structure according to claim 1 wherein said structure is essentially free of plasticizer.

4. A one-piece light-controlling structure according to claim 1 wherein said structure consists essentially of a material which is substantially photographically inert.

5. A one-piece light-controlling structure according to claim 1 wherein said structure consists essentially of a material which is essentially free of susceptibility to fungus.

6. A one-piece light-controlling structure according to claim 1 wherein said structure consists essentially of a material which retains its flexibility, semi-rigidity, and high resistance to fatigue failure on flexing within temperature limits from −20° F. to 180° F.

7. A one-piece light-controlling structure according to claim 1 wherein said structure consists essentially of polypropylene.

8. For use in apparatus in which light is transmitted along a predetermined axis and having a movable element positionable in accordance with the amount of light to be transmitted along said axis, light-controlling means comprising a one-piece structure of flexible, semi-rigid, long-chain linear molecular polymeric material having a high resistance to fatigue failure on flexing, said unitary structure including a mounting portion and at least one light-regulating portion, said mounting portion being attachable to said apparatus to mount said unitary structure therein and to support said light-regulating portion for movement to a plurality of positions for controlling the amount of light passing along said axis, said one-piece structure further including at least one portion which is more flexible than other portions interposed between said mounting portion and said light-regulating portion to permit relative movement therebetween, said one portion being small relative to the size of said structure, said light-regulating portion being coupled with said movable element for positioning said light-regulating portion in accordance with the position of said element.

9. For use in apparatus in which light is transmitted along at least one predetermined axis and having a movable element positionable in accordance with the amount of light to be transmitted along said axis the improvement comprising: a one-piece light-controlling structure including at least one light-regulating portion, at least one mounting portion, and at least one drive portion; said mounting portion being attachable to said apparatus to mount said one-piece structure therein and to support said light-regulating portion for movement to a plurality of positions for controlling the amount of light passing along said axis, said drive portion being coupled with said movable element for positioning said light-regulating portion in accordance with the position of said element, and said one-piece structure further including at least one portion which is more flexible than another portion and which is interposed between said mounting and drive portions to permit relative movement therebetween, said one portion being small with respect to the size of said structure, said portion which is more flexible being remote from said mounting portion.

10. A one-piece light-controlling structure according to claim 9 wherein said light-regulating portion comprises at least one vane member positionable in alignment with said axis and movable to form a variable aperture for said transmitted light.

11. A one-piece light-controlling structure according to claim 9 wherein said resilient flexible portion biases said drive portion and said light-regulating portion toward predetermined limiting positions.

12. A one-piece light-controlling structure according to claim 9 wherein said apparatus has at least two axes along which light is transmitted and wherein said light-regulating portion comprises at least two vanes each of which is supported in said apparatus by a respective mounting portion for movement to a plurality of positions for controlling the amount of light passing along each said respective axis, each said mounting portion being contiguous with its respective vane.

13. A one-piece light-controlling structure according to claim 12 wherein said structure is formed in a general S-shape and wherein said vanes are formed, respectively, at the free ends of the S-shaped structure.

14. In a camera having a picture-taking axis along which film-exposing light is receivable and having at least one movable element positionable in accordance with the intensity of scene luminance, the improvement comprising: a one-piece exposure-controlling structure of semi-rigid material, said structure comprising a mounting portion being attached to said camera to support said unitary structure therein, a pair of aperture-forming vanes positioned to regulate light passing along said axis, a pair of resiliently flexible portions each intermediate a mounting portion and a vane for biasing each said vane toward a predetermined limiting position, said flexible portions being small in comparison to the size of said structure, and at least one drive portion coupled to said movable element for movement therewith, said flexible portions being remote from said mounting portion, said vanes being driven against said bias to any one of a plurality of positions in response to the movement of said drive portion whereby the aperture formed by said vanes varies as a function of scene luminance.

15. A one-piece exposure-controlling structure according to claim 14 wherein said light-regulating aperture decreases as said drive portion is moved away from said mounting portion.

16. A one-piece exposure-controlling structure according to claim 14 wherein said light-regulating aperture decreases as said drive portion is moved toward said mounting portion.

17. In apparatus having an axis along which light is transmitted and having a movable element positionable in accordance with the amount of light to be transmitted along said axis, the improvement comprising: a one-piece light-controlling structure including a pair of aperture-forming vanes and a first pair of resiliently flexible portions for biasing each said vane toward a predetermined limiting position, a mounting portion, and at least one drive portion interconnected with each said vane by a second pair of flexible portions, said mounting portion being attached to said apparatus to position said vanes for regulating light passing along said axis, and said drive portion being coupled to said movable element for driving said vanes against said bias to any one of a plurality of positions in response to the movement of said element.

18. A one-piece light-controlling structure according to claim 17 wherein said structure is formed in a general O-shape, said mounting portion and said drive portion being formed at opposite ends of said O-shaped structure, and said aperture-forming vanes being oppositely disposed between said mounting and drive portions.

19. A one-piece light-controlling structure according to claim 17 wherein said structure is formed in a general U-shape and wherein said drive portion comprises a pair of drive members formed at the free ends of said U-shaped structure, each said drive member being interconnected with said movable element, said aperture-forming vane portions being oppositely disposed along the two legs of said U-shaped structure intermediate each said drive member and said mounting portion.

20. For use in apparatus in which light is transmittable along a predetermined axis and having a movable element positionable in accordance with the amount of light to be transmitted along said axis, light-controlling means comprising a one-piece structure of flexible, semi-rigid synthetic crystalline polymeric material having a high resistance to fatigue failure on flexing; said unitary structure including at least one light-regulating portion, a mounting portion and at least one drive portion; said mounting portion being attachable to said apparatus to mount said unitary structure therein and to support said light-regulating portion for movement to a plurality of positions for controlling the amount of light passing along said axis, said drive portion being coupled to said movable element for positioning said light-regulating portion in accordance with the position of said element; said one-piece structure further including at least one first narrowed portion interposed between said mounting portion and said light-regulating portion to permit relative movement therebetween, and further including at least one second narrowed portion interposed between said drive portion and said light regulating portion to permit relative movement therebetween; the limits of said relative movement between said mounting drive, and light-regulating portions being predetermined such that the elastic limit of said material comprising one of said narrowed portions is not exceeded.

21. For use in a camera having a picture-taking axis along which film-exposing light is received, and a movable element positionable in accordance with the intensity of scene lumiance, the improvement comprising: a one-piece exposure-controlling structure including a plurality of aperture-forming vane members, a plurality of mounting portions and a drive portion, each said mounting portion being contiguous to a respective one of said vane members and being attached to said camera to mount said one-piece structure therein and to support said vane members in alignment with said picture-taking axis to provide a variable aperture for said film-exposing light, said drive portion being coupled with said movable element for movement responsive thereto, and said one-piece structure further including a plurality of flexible portions interposed between said drive portion and said mounting portions to permit relative movement therebetween for controlling the size of the aperture formed by said vanes as a function of the movement of said drive portion.

References Cited

UNITED STATES PATENTS

| 2,206,086 | 7/1940 | Galyon | 95—64 |
| 3,205,569 | 9/1965 | Nerwin et al. | 95—64 |
| 3,253,523 | 5/1966 | Hutchinson | 95—64 XR |

JOHN M. HORAN, *Primary Examiner.*

NORTON ANSHER, *Examiner.*

J. F. PETERS, *Assistant Examiner.*